(12) United States Patent
Dutta

(10) Patent No.: US 8,479,015 B2
(45) Date of Patent: Jul. 2, 2013

(54) VIRTUAL IMAGE MANAGEMENT

(75) Inventor: Arijit Dutta, Bopodi (IN)

(73) Assignee: Oracle International Corporation, Redwood Shores, CA (US)

( * ) Notice: Subject to any disclaimer, the term of this patent is extended or adjusted under 35 U.S.C. 154(b) by 942 days.

(21) Appl. No.: 12/253,526

(22) Filed: Oct. 17, 2008

(65) Prior Publication Data

US 2010/0100744 A1 Apr. 22, 2010

(51) Int. Cl.
*G06F 11/30* (2006.01)
*G06F 9/455* (2006.01)
*G06F 7/04* (2006.01)

(52) U.S. Cl.
USPC .................................. 713/189; 718/1; 726/22

(58) Field of Classification Search
USPC ........................... 713/182, 165, 189; 455/410
See application file for complete search history.

(56) References Cited

U.S. PATENT DOCUMENTS

| | | | |
|---|---|---|---|
| 6,356,437 B1* | 3/2002 | Mitchell et al. | 361/679.03 |
| 6,697,894 B1* | 2/2004 | Mitchell et al. | 710/73 |
| 7,209,559 B2* | 4/2007 | Rodriguez et al. | 380/228 |
| 7,581,255 B2* | 8/2009 | Alkove et al. | 726/26 |
| 2002/0095589 A1* | 7/2002 | Keech | 713/189 |
| 2003/0130032 A1* | 7/2003 | Martinek et al. | 463/29 |
| 2004/0042676 A1* | 3/2004 | Srinivasa | 382/254 |
| 2004/0064704 A1* | 4/2004 | Rahman | 713/182 |
| 2006/0174240 A1* | 8/2006 | Flynn | 717/170 |
| 2006/0230219 A1* | 10/2006 | Njoku et al. | 710/316 |
| 2007/0033419 A1 | 2/2007 | Kocher et al. | |
| 2007/0050467 A1* | 3/2007 | Borrett et al. | 709/213 |
| 2007/0083935 A1* | 4/2007 | Uchikawa et al. | 726/26 |
| 2007/0110246 A1* | 5/2007 | Sueyoshi et al. | 380/277 |
| 2007/0122027 A1* | 5/2007 | Kunita et al. | 382/154 |
| 2007/0135216 A1* | 6/2007 | Martinek et al. | 463/29 |
| 2007/0166013 A1* | 7/2007 | Yogeshwar et al. | 386/112 |
| 2007/0180493 A1* | 8/2007 | Croft et al. | 726/2 |
| 2007/0250833 A1 | 10/2007 | Araujo, Jr. et al. | |
| 2007/0271275 A1* | 11/2007 | Fassette et al. | 707/10 |
| 2007/0300220 A1* | 12/2007 | Seliger et al. | 718/1 |
| 2007/0300221 A1* | 12/2007 | Hartz et al. | 718/1 |
| 2008/0086728 A1 | 4/2008 | Lam et al. | |
| 2008/0109362 A1* | 5/2008 | Fransdonk | 705/51 |
| 2008/0146272 A1* | 6/2008 | Rao et al. | 455/556.1 |
| 2008/0301447 A1* | 12/2008 | Hughes et al. | 713/176 |
| 2009/0089254 A1* | 4/2009 | Von Kaenel et al. | 707/3 |
| 2009/0132776 A1* | 5/2009 | Kurauchi | 711/163 |
| 2010/0071025 A1* | 3/2010 | Devine et al. | 726/1 |
| 2010/0074441 A1* | 3/2010 | Pauker et al. | 380/45 |
| 2010/0082490 A1* | 4/2010 | Rosenblatt et al. | 705/64 |
| 2011/0083181 A1* | 4/2011 | Nazarov | 726/23 |

* cited by examiner

*Primary Examiner* — Krista Zele
*Assistant Examiner* — Margishi Desai
(74) *Attorney, Agent, or Firm* — Osha Liang LLP

(57) ABSTRACT

Apparatus, systems, and methods may operate to create a virtual image, define usage privileges associated with the virtual image in a description file, and associate a coded summary of an encrypted version of the description file with the virtual image. Other activities may include receiving a request to access the virtual image, authenticating a transmitted version of the coded summary to determine validity of the encrypted version, and processing the encrypted version to determine whether the request to access will be granted. Additional apparatus, systems, and methods are disclosed.

13 Claims, 5 Drawing Sheets

VIRTUAL IMAGE MANAGEMENT

BACKGROUND

Server virtualization provides a plethora of applications to enable a more fluid and agile computing environment. Some of the applications that are relevant in this context include virtual appliances, virtual desktops, and Software-as-a-Service. While virtualization allows operating systems and application stacks to become mobile, it also presents problems with respect to controlling the end-use of virtual images. For example, while alteration and repeated cloning of virtual images can be controlled in some secure environments, there are no such controls outside those environments. Thus, outside of certain specialized environments, there is no easy way to securely manage the virtual image life cycle.

SUMMARY

In various embodiments, apparatus, systems, and methods that support virtual image management within a wide variety of environments are provided. For example, in some embodiments, access to virtual images is provided by creating a virtual image, defining usage privileges associated with the virtual image in a description file, and associating a coded summary of an encrypted version of the description file with the virtual image. Other activities may include receiving a request to access the virtual image, authenticating a transmitted version of the coded summary to determine validity of the encrypted version, and processing the encrypted version to determine whether the request for access will be granted. Additional embodiments are described, and along with the foregoing examples, will be set forth in detail below.

DETAILED DESCRIPTION

The inventor has discovered that virtual images can be managed in a more secure fashion by controlling access to them. User privileges for a particular image can be selected, either via system default, the system administrator, or a user that creates the image. These privileges can be defined in a description file, perhaps using the eXtensible Markup Language (XML), and a coded summary of an encrypted version of the description file can then be associated with the virtual image. In this way, a hypervisor that has received the virtual image, the encrypted version, and the coded summary can be used to authenticate the coded summary to determine that the encrypted version of the description file is valid. Upon determining validity, access to the virtual image can be granted, based on the privileges contained in the description file.

As used herein, a "virtual image" may includes a virtual appliance, a virtual machine, an operating system, and/or one or more applications.

A "virtual appliance" is a fully pre-installed and pre-configured application and operating system environment.

A "virtual machine" is a fully pre-installed and pre-configured operating system, without application software.

Embodiments of the invention can be implemented in a variety of architectural platforms, operating and server systems, devices, systems, and applications. Any particular architectural layout or implementation presented herein is thus provided for purposes of illustration and comprehension only, and is not intended to limit the various embodiments.

Figure 1:
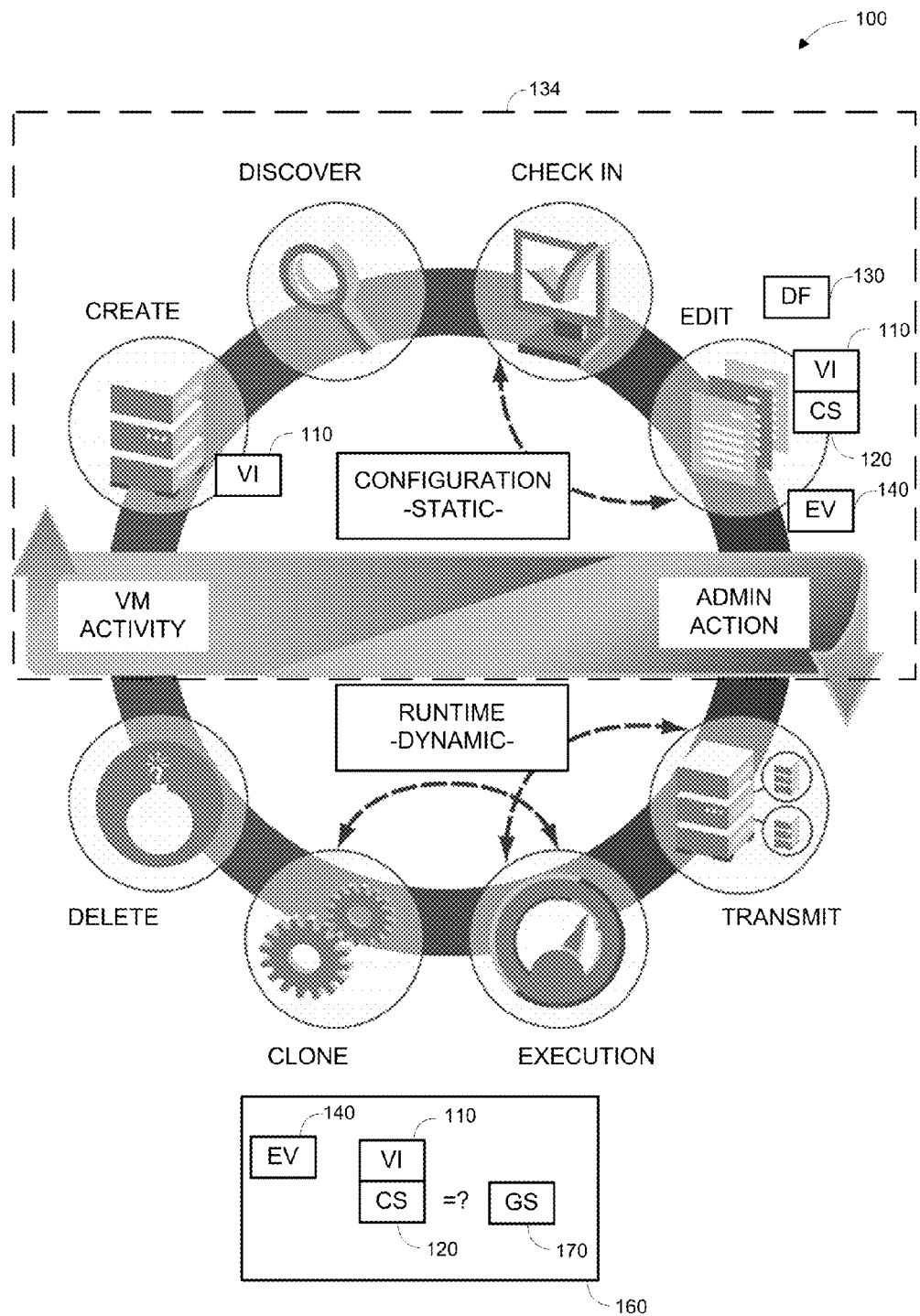
FIG. 1 is a life cycle diagram for a virtual image that is managed according to various embodiments of the invention.

FIG. 1 is a life cycle diagram 100 for a virtual image 110 that is managed according to various embodiments of the invention. This diagram 100 depicts the typical virtual image life cycle, where a virtual image 110 is created, discovered, checked-in to the system, and edited before becoming finalized. At this point a coded summary 120 of an encrypted version 140 of the description file 130 is associated in some manner with the virtual image 110. Thus, even when the virtual image 110 travels outside the confines of a secure grid 134 (where it may have been backed by policies defined for a particular organization), access to the virtual image 110 to initiate operations such as transmission, execution, cloning, and deletion can be controlled according to the content of the encrypted version 140 of the description file 130. Operating in this manner makes it easier for independent software vendors to virtualize their application stacks, perhaps converting them into virtual appliances, because the access controls can travel with the application.

Thus, a hypervisor 160 that hosts the virtual image 110 can become aware of the privileges attached to it by processing the coded summary 120 and the encrypted version 140 of the description file. Access to the virtual image 110 can then be granted or denied based on the content of the description file 130.

The privileges that might be associated with the virtual image 110 via the coded summary 120 include: whether users can copy the virtual image 110, whether any new applications can be added to the virtual image (e.g., is the image 110 write-protected?), whether the operating system environment can be personalized, and how many clones of the virtual image 110 are allowed, among others. A cloning counter, to track the number of times the image 110 has been cloned, may also follow the image 110 as part of the information contained in the encrypted version 140.

For example, to manage a virtual image 110 according the some embodiments, the description file 130 can be created using XML to define the privileges that will be attached to the image 110. The description file 130 can then be encrypted, providing the encrypted version 140. A hash or checksum function, among others, can be applied to the encrypted version 140 to provide the coded summary 120, which may be fused to the virtual image 110, becoming a part of the virtual image 110.

To verify that the virtual image 110 is then accompanied by a legal and uncompromised version of the description file 130, in the form of the encrypted version 140, the same function used to produce the coded summary 120 transmitted to the hypervisor 160 can be applied by the hypervisor 160 to the encrypted version 140, and the result (e.g., a generated summary 170) can be compared to the coded summary 120. If there is a match, the encrypted version 140 is validated, and can be decrypted to determine which privileges have been attached to the virtual image 110. Thus, many embodiments may be realized.

Figure 2:
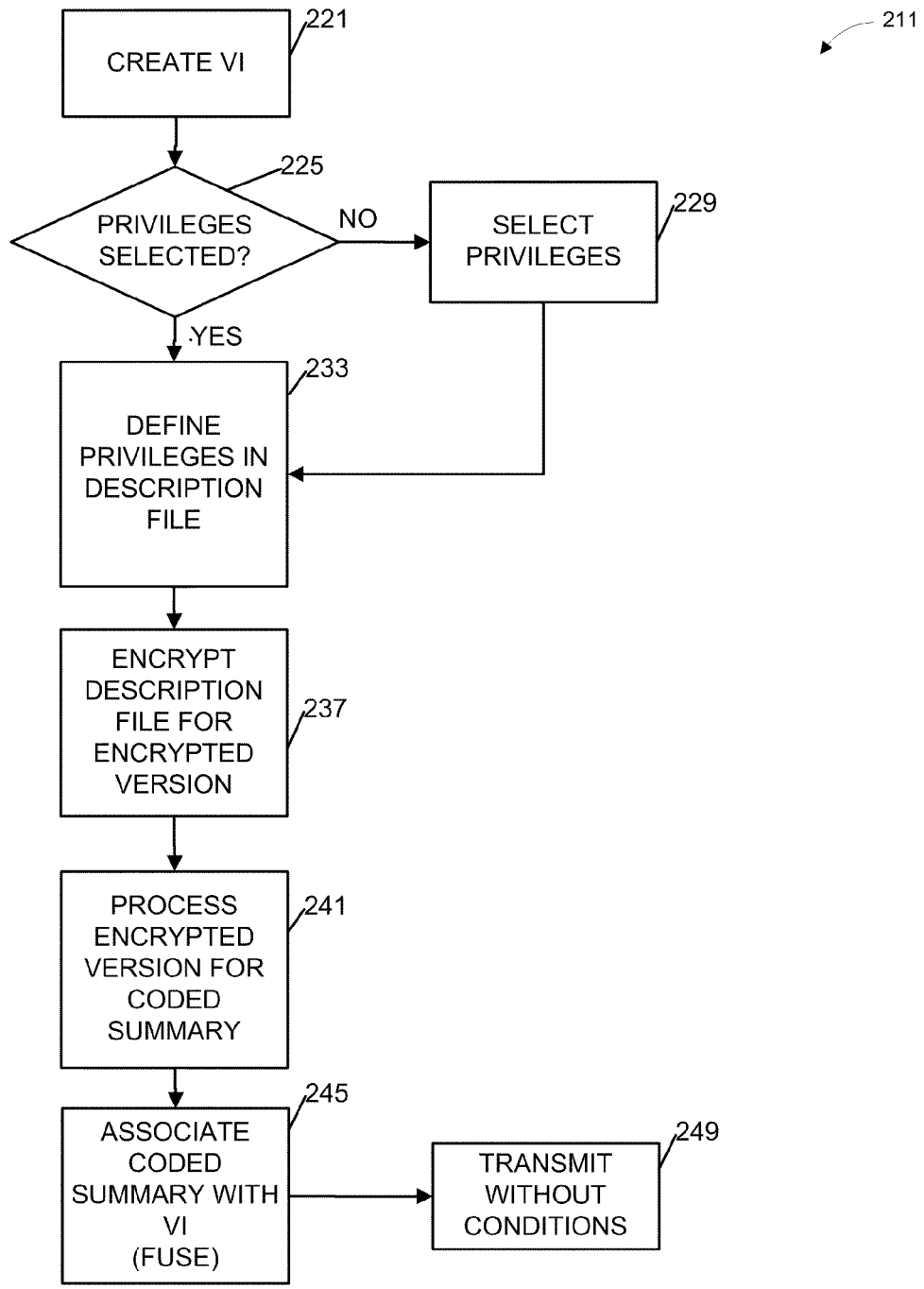
FIG. 2 is an activity flow diagram illustrating a variety of methods according to various embodiments of the invention.

For example, FIG. 2 is a flow diagram illustrating a variety of methods 211 according to various embodiments of the invention. The methods 211 are implemented in a machine-accessible and readable medium, and are operational over processes within and among networks. The networks may be wired, wireless, or a combination of wired and wireless. The methods 211 may be implemented as instructions, which when accessed by a machine, cause the machine to perform the processing depicted and described with respect to FIG. 1.

Thus, in some embodiments, a computer-implemented method 211 of managing virtual images may begin at block 221 with creating a virtual image. the virtual image, in turn, may comprise any number of elements, including an operating system, a virtual machine, a virtual appliance, one or more applications, and/or a tape archive (*.tar) file, among others.

If it is determined that no usage privileges have yet been selected at block 225, then the method 211 may continue on to block 229 with selecting one or more usage privileges, perhaps including one or more of execution, transmission, modification, copying, cloning, or deleting the virtual image. Transmission may comprise streaming the virtual image over a global communications network (e.g., the Internet), where streaming is just one mechanism of many that can be used to transmit the virtual image (as well as the encrypted version and the coded summary) from one location to another. The usage privileges can be selected as part of a default arrangement, by a system administrator, or by the user that first creates the image, among others.

Once the privileges have been determined for the virtual image, the method 211 may continue on to block 233 with defining the usage privileges associated with the virtual image in a description file. The method 211 may then continue on to block 237 to include encrypting the description file to provide the encrypted version. Any method of encryption known to those of ordinary skill in the art may be used.

The method 211 may continue on to block 241 with processing the encrypted version to provide the coded summary, which can then serve to identify a valid encrypted version of the description file that travels with the virtual image. The processing may include hashing the encrypted version to provide a coded summary that comprises a hash of the encrypted version. In some embodiments, the processing may include applying a checksum function to the encrypted version to provide a coded summary that comprises a checksum of the encrypted version. Other reproducible coding mechanisms known to those of ordinary skill in the art can be applied to the encrypted version to produce the coded summary.

The method 211 may continue on to block 245 with associating the coded summary with the virtual image. For example, the coded summary and the virtual image may be loosely associated via a linking table or an index, or more closely associated, perhaps by fusing the coded summary to the virtual image to become part of the virtual image.

The method 211 may go on to block 249 to include transmitting, without conditions, the virtual image, the encrypted version, and the coded summary to a machine (e.g., a client or server). The machine, in turn, may include a hypervisor configured to execute the virtual image. The hypervisor can be used to control access to the virtual image based on information included in the coded summary and the encrypted version, as described previously. In this way, once the virtual image is associated with the coded summary, the image, the encrypted version, and the coded summary can be freely transmitted, both inside and outside secure grid environments. Still further embodiments may be realized.

Figure 3:
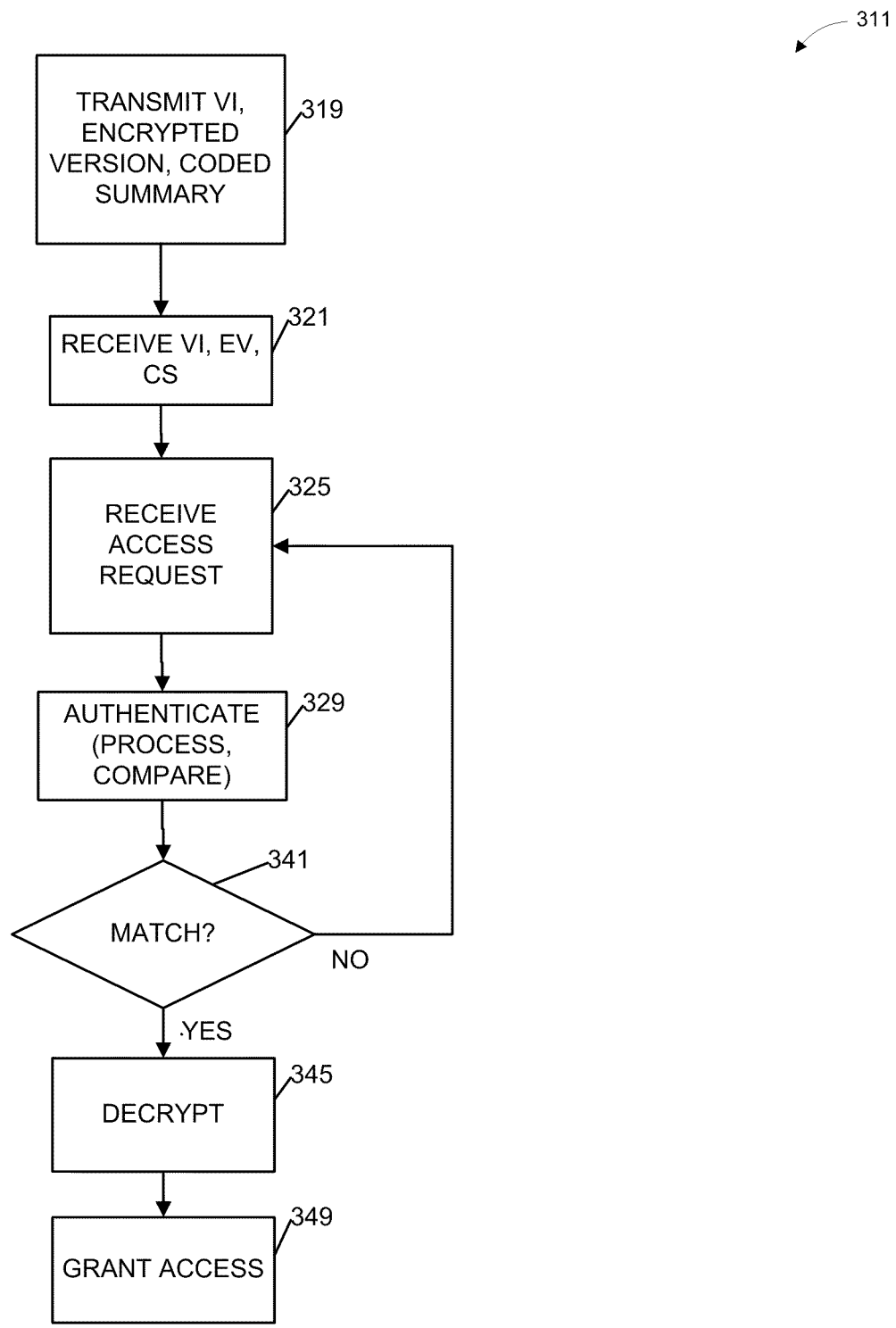
FIG. 3 is an activity flow diagram illustrating additional methods according to various embodiments of the invention.

For example, FIG. 3 is a flow diagram illustrating additional methods 311 according to various embodiments of the invention. The methods 311 are implemented in a machine-accessible and readable medium, and are operational over processes within and among networks. The networks may be wired, wireless, or a combination of wired and wireless. The methods 311 may be implemented as instructions, which when accessed by a machine, cause the machine to perform the processing depicted and described with respect to FIG. 1.

In some embodiments, a computer-implemented method 311 of managing virtual images begins at block 319 with transmitting a virtual image (as well as an encrypted version of a description file that has usage privileges associated with the virtual image, and a coded summary of the encrypted version) from within a shared, virtualized resource pool to a location outside the shared, virtualized resource pool, perhaps in responding to a request originating from outside the pool. Since access to the virtual image is controlled by the associated coded summary, the virtual image may be freely transmitted to any location outside the pool (e.g., off the secure grid).

The method 311 may continue on to block 321 with receiving the virtual image, the encrypted version, and the coded summary, as described previously. For example, if a system includes a server and a client, the receiving activity at block 321 may comprise receiving, at a client device, the virtual image, the encrypted version, and the coded summary, from a server device. The method 311 may continue on to block 325 with receiving a request to access the virtual image, perhaps at a hypervisor that is hosting the virtual image.

The method 311 may continue on to block 329 with authenticating the transmitted coded summary of an encrypted version of a description file, where the coded summary is associated with the virtual image, to determine the validity of the encrypted version. The authentication activity at block 329 may include processing the encrypted version to provide a generated coded summary. For example, the processing activity at block 329 may include hashing the encrypted version, or applying a checksum to the encrypted version, as noted previously. The authentication activity at block 329 may also include comparing the transmitted coded summary (usually received in association with the virtual image) to the generated coded summary. If the two values do not match, as determined at block 341, the method 341 may return to block 325 to receive another access request.

If the transmitted coded summary and the generated coded summary match, as determined at block 341, the method 311 may continue on to block 345 with decrypting the encrypted version to determine the existence of a set of usage privileges for which the request to access the virtual image (received at block 325) can be granted.

In this way, a hypervisor can authenticate the validity of the encrypted version of the description file provided along with the virtual image. To do this, the hypervisor runs the same process on the encrypted version it has received, as was previously accomplished to produce the coded summary that was transmitted to it. The resulting generated summary can then be compared against the transmitted coded summary. Once authentication is successfully completed, the hypervisor can operate to decrypt the encrypted description file.

Thus, the method 311 may continue on to block 349 with granting the access associated with the request if the comparing activity at block 341 provides a match between the transmitted coded summary and the generated coded summary. That is, if the two coded summaries match, then the encrypted description file associated with the virtual image is valid, and access can be granted according to the user privileges contained in the description file.

The methods described herein do not have to be executed in the order described, or in any particular order, unless so specified. Moreover, various activities described with respect to the methods identified herein can be executed in repetitive, looped, serial, or parallel fashion. The individual activities of the methods shown in FIGS. 2 and 3 can also be combined with each other and/or substituted, one for another, in various ways. Information, including parameters, commands, operands, and other data, can be sent and received in the form of one or more carrier waves.

Figure 4:
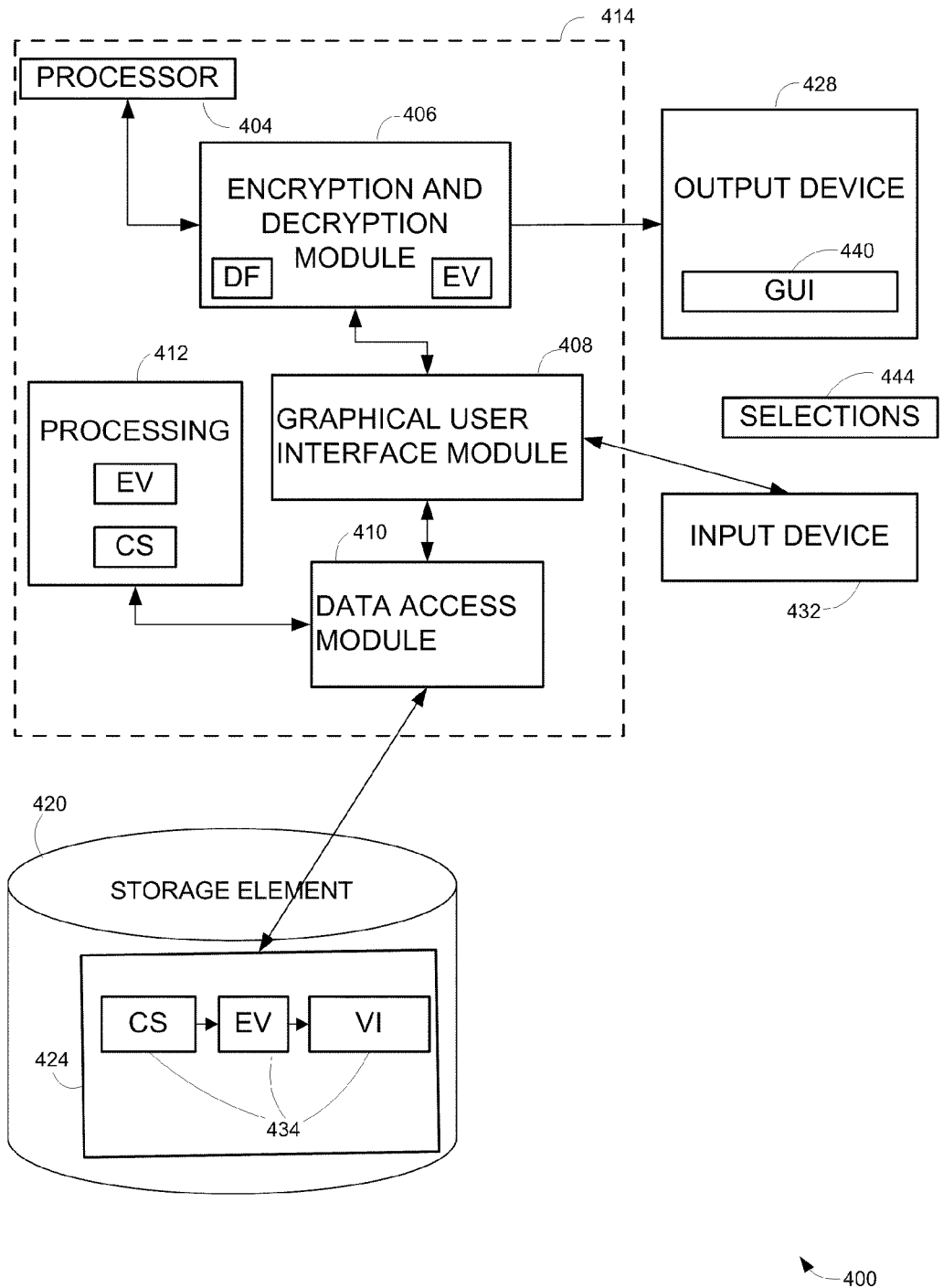
FIG. 4 is a block diagram of an apparatus and system that can operate to manage virtual images according to various embodiments of the invention.

FIG. 4 is a block diagram of an apparatus 414 and system 400 that can operate to manage virtual images according to various embodiments of the invention. The apparatus 414 and system 400 may be implemented in a machine-accessible and readable medium and is operational over one or more networks. The networks may be wired, wireless, or a combination of wired and wireless. The apparatus 414 and system 400 implement, among other things, the processing associated with the life cycle activity of FIG. 1, and the methods 211 and 311 of FIGS. 2 and 3, respectively.

The system 400 may include a number of modules such as one or more processors 404, an encryption/decryption module 406, a GUI module 408, a data access module 410, and a processing module 412. The encryption/decryption module 406 and the GUI module 408 may take the form of an integral module, or exist as separate modules, as shown. The encryption/decryption module 406 may be integrated, as shown, or divided into separate encryption and decryption modules. The processing module 412 may be used to apply a hash function, a checksum function, or some other reproducible coding function to an encrypted version EV of the description file DF, providing the coded summary CS according to various embodiments.

The modules shown may be associated within an apparatus 414, such as a personal digital assistant (PDA), a laptop computer, a personal computer, a workstation, a client, a server, or any other machine, as indicated by their containment within the dashed box.

In order to avoid obscuring the components of FIG. 4, connecting lines between each of the elements within the apparatus 414 have not been shown. However, those of ordinary skill in the art will understand that any of the individual elements shown to be located within the confines of the apparatus 414 may be operably coupled to any other element within the apparatus 414. Similarly, those of ordinary skill in the art will understand that any of the components shown to be located within the confines of the apparatus 414 may also be located outside the apparatus 414, and appropriately coupled to the apparatus 414 via wired or wireless networks or other interface mechanisms.

The data access module 410 may be used by the encryption/decryption module 406 to access a storage element 420, such as a database, a memory, a disk, or other storage device. The storage element 420 may serve to contain one or more items having electronic content 424, such as a virtual image VI, encrypted version EV, and coded summary CS, as well as other types of information 434, including encryption and decryption keys, used to decode encrypted versions of the description file DF back into their original form. The data access module 410 may operate to read from and/or write to the electronic content 424 and may provide reading and writing services for the benefit of other system modules, including the processing module 412, the GUI module 408, the encryption/decryption module 406, and the processor 404. The electronic content 424 may be transferred to other devices, such clients, servers, etc.

The data access module 410 may be present in some embodiments, and absent in others. When present, the data access module 410 may operate as a mediator between the various components of the system 400 and the electronic content 424. For example, the storage element 420 may be included in a remote server.

The encryption/decryption module 406 may be operably coupled to an output device 428, such as a server, client device, display device (e.g., monitor, projector, video card, etc.), printer, or loudspeaker, among others. The output device 428 may be used for presenting renderings of the output generated by or derived from the electronic content 424. Rendering may take the form of displaying screen images of the description file DF, for example. The GUI module 408 may be operably connected to the encryption/decryption module 406 and the data access module 410 to present renderings by way of the GUI 440. Thus, many embodiments may be realized.

For example, an apparatus 414 implementing the various methods described may comprise one or more processors 404, and a memory, such as the storage element 420, to store instructions (as part of the information 434) which, when executed by the one or more processors 404, results in the one or more processors 404 operating to create a virtual image VI, to define usage privileges associated with the virtual image VI in a description file DF, and to associate a coded summary CS of an encrypted version EV of the description file DF with the virtual image VI.

In some embodiments, the apparatus 414 includes a module (e.g., the GUI module 408) to receive indications from a user input device 432 to provide one or more selections 444 of the usage privileges. The user input device 432 may comprise a keyboard, mouse, touch pad, etc.

The apparatus 414 may comprise an encryption module (as part of the encryption/decryption module 406) to provide the encrypted version EV of the description file DF. The apparatus 414 may also comprise a processing module 412 to process the encrypted version EV to provide the coded summary CS. Still further embodiments may be realized.

Figure 5:
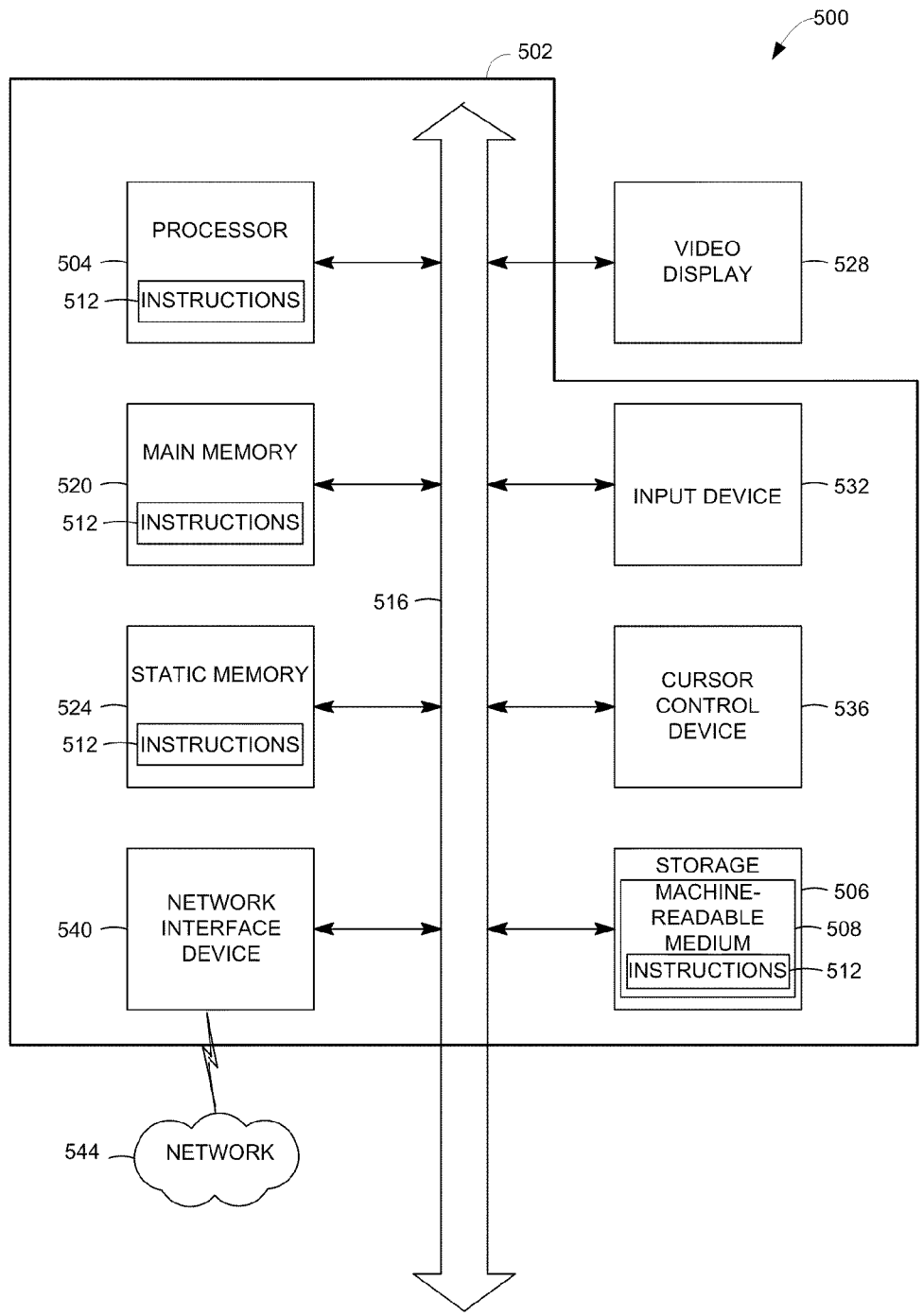
FIG. 5 is a block diagram of an article of manufacture, including a machine, according to various embodiments of the invention.

For example, FIG. 5 is a block diagram of an article 500 of manufacture, including a machine 502, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 500 of manufacture, such as a computer, a memory system, a magnetic or optical disk, some other storage device, and/or any type of electronic device or system may include one or more processors 504 coupled to a machine-readable medium 508 such as a memory (e.g., removable storage media, as well as any memory including an electrical, optical, or electromagnetic conductor) having instructions 512 stored thereon (e.g., computer program instructions), which when executed by the one or more processors 504 result in the machine 502 performing any of the actions described with respect to the methods above.

The machine 502 may take the form of a computer system having a processor 504 coupled to a number of components directly, and/or using a bus 516. Thus, the machine 502 may be similar to or identical to the apparatus 414 or system 400 shown in FIG. 4.

Turning now to FIG. 5, it can be seen that the components of the machine 502 may include main memory 520, static or non-volatile memory 524, and mass storage 506. Other components coupled to the processor 504 may include an input device 532, such as a keyboard, or a cursor control device 536, such as a mouse. An output device 528, such as a video display, may be located apart from the machine 502 (as shown), or made as an integral part of the machine 502.

A network interface device 540 to couple the processor 504 and other components to a network 544 may also be coupled to the bus 516. The instructions 512 may be transmitted or received over the network 544 via the network interface device 540 utilizing any one of a number of well-known transfer protocols (e.g., HyperText Transfer Protocol). Any of these elements coupled to the bus 516 may be absent, present singly, or present in plural numbers, depending on the specific embodiment to be realized.

The processor 504, the memories 520, 524, and the storage device 506 may each include instructions 512 which, when executed, cause the machine 502 to perform any one or more of the methods described herein. In some embodiments, the machine 502 operates as a standalone device or may be connected (e.g., networked) to other machines. In a networked environment, the machine 502 may operate in the capacity of a server or a client machine in server-client network environment, or as a peer machine in a peer-to-peer (or distributed) network environment.

The machine 502 may comprise a personal computer (PC), a tablet PC, a set-top box (STB), a PDA, a cellular telephone, a web appliance, a network router, switch or bridge, server, client, or any machine capable of executing a set of instructions (sequential or otherwise) that specify actions to be taken by that machine. Further, while only a single machine 502 is illustrated, the term "machine" shall also be taken to include any collection of machines that individually or jointly execute a set (or multiple sets) of instructions to perform any one or more of the methodologies discussed herein.

For example, in some embodiments, the instructions 512 may cause the machine 502 to execute a computer-implemented method comprising receiving a request to access a virtual image, authenticating a transmitted coded summary of an encrypted version of a description file associated with the virtual image to determine validity of the encrypted version, and processing the encrypted version to determine whether the request to access will be granted. Further activities of the method may include receiving, from a server device, the virtual image, the encrypted version, and the coded summary at a client device.

While the machine-readable medium 508 is shown as a single medium, the term "machine-readable medium" should be taken to include a single medium or multiple media (e.g., a centralized or distributed database, and/or associated caches and servers, and or a variety of storage media, such as the registers of the processor 504, memories 520, 524, and the storage device 506 that store the one or more sets of instructions 512. The term "machine-readable medium" shall also be taken to include any medium that is capable of storing, encoding or carrying a set of instructions for execution by the machine and that cause the machine 502 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Implementing the apparatus, systems, and methods of the various embodiments may thus provide additional flexibility with respect to managing virtual images. For example, when virtual images are associated with a coded summary of the encrypted version of the description file, as described herein, the virtual image may be more freely transmitted to hypervisor hosts. Using the information supplied, these hosts, in turn, are able to authenticate the coded summary, and verify the validity of the encrypted version of the description file. This management methodology may ease restrictions on the transmission of virtual images, including those of virtual machines and virtual appliances.

Various embodiments may be implemented as a standalone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Certain applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). Modules may include hardware circuitry, optical components, single or multi-processor circuits, memory circuits, software program modules and objects, firmware, and combinations thereof, as appropriate for particular implementations of various embodiments. The term "module" includes an identifiable portion of code, data, or a computational object to achieve a particular function, operation, processing, or procedure.

Some embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of ordinary skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure.

This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
creating, by a server computing device, a virtual image configured for execution by a hypervisor on a client computing device;
obtaining, by the server computing device, usage privileges defining access to the virtual image;
storing, by the server computing device, the usage privileges in a description file;
generating an encrypted version of the description file;
deriving a first coded summary from the encrypted version of the description file, wherein the first coded summary identifies a valid encrypted version of the description file; and
transmitting the virtual image, the encrypted version of the description file, and the first coded summary from the server computing device to the client computing device, wherein the hypervisor, in response to obtaining the virtual image:
derives a second coded summary from the encrypted version of the description file;
authenticates the encrypted version by determining that the first coded summary matches the second coded summary;
obtains, in response to the authentication, the description file by decrypting the encrypted version of the description file;
executes the virtual image according to the usage privileges in the description file; and
restricts access to the virtual image based on the usage privileges in the description file.

2. The method of claim 1, wherein the deriving the first coded summary comprises:
hashing the encrypted version to obtain a hash, wherein the first coded summary comprises the hash of the encrypted version.

3. The method of claim 1, wherein the deriving the first coded summary comprises:
applying a checksum algorithm to the encrypted version to obtain a checksum, wherein the coded summary comprises the checksum of the encrypted version.

4. The method of claim 1, wherein the usage privileges comprise at least one selected from a group consisting of permission to execute the virtual image, permission to transmit the virtual image, permission to modify the virtual image, permission to copy the virtual image, and permission to clone the virtual image.

5. The method of claim 1, further comprising:
fusing, by the server computing device, the first coded summary to the virtual image to become part of the virtual image.

6. A method comprising:
receiving, by a hypervisor on a client computing device, a request to access a virtual image;
obtaining, by the client computing device from a server computing device, the virtual image, an encrypted version of a description file defining access to the virtual image, and a first coded summary derived from the encrypted version;
deriving, by the client computing device, a second coded summary from the encrypted version of the description file;
authenticating, by the client computing device, the encrypted version of the description file by determining that the first coded summary matches the second coded summary;
obtaining, in response to the authentication, the description file by decrypting the encrypted version;
determining, based on usage privileges defined in the description file, that the request to access the virtual image will be granted; and
executing, by the hypervisor after granting access to the virtual image, the virtual image according to the usage privileges in the description file.

7. The method of claim 6, wherein the usage privileges comprise at least one selected from a group consisting of permission to execute the virtual image, permission to transmit the virtual image, permission to modify the virtual image, permission to copy the virtual image, and permission to clone the virtual image.

8. The method of claim 7, wherein obtaining the virtual image comprises:
receiving the virtual image from the server computing device, wherein the virtual image is streamed over a global communications network.

9. The method of claim 6, wherein the server computing device comprises a location within a shared, virtualized resource pool and the client computing device comprises a location outside the shared, virtualized resource pool, wherein the virtual image is transmitted responsive to the request originating from the first computing device.

10. An apparatus comprising:
one or more processors;
a memory to store instructions which, when executed by the one or more processors, results in the one or more processors operating to:
create a virtual image configured for execution by a hypervisor on a client computing device;
obtain usage privileges defining access to the virtual image;
store the usage privileges in a description file;
generate an encrypted version of the description file;
derive a first coded summary from the encrypted version of the description file, wherein the first coded summary identifies a valid encrypted version of the description file; and
transmit the virtual image, the encrypted version of the description file, and the first coded summary to a client computing device comprising a hypervisor, wherein the hypervisor, in response to obtaining the virtual image:
derives a second coded summary from the encrypted version of the description file;
authenticates the encrypted version of the description file by determining that the first coded summary matches the second coded summary;
obtains, in response to the authentication, the description file by decrypting the encrypted version of the description file;
executes the virtual image according to the usage privileges in the description file; and
restricts access to the virtual image based on the usage privileges in the description file; and
a module to receive indications from a user input device to provide a selection of the usage privileges.

11. The apparatus of claim 10, further comprising:
an encryption module to provide the encrypted version.

12. The apparatus of claim 11, further comprising:
a processing module to process the encrypted version to provide the first coded summary.

13. A non-transitory machine-readable storage medium storing instructions that, when executed by a machine, cause the machine to perform a method comprising:
- receiving, by a hypervisor on a client computing device, a request to access a virtual image;
- obtaining, by the client computing device from a server computing device, the virtual image, an encrypted version of a description file defining access to the virtual image, and a first coded summary derived from the encrypted version;
- deriving, by the client computing device, a second coded summary from the encrypted version of the description file;
- authenticating, by the client computing device, the encrypted version of the description file by determining that the first coded summary matches the second coded summary;
- obtaining, in response to the authentication, the description file by decrypting the encrypted version of the description file;
- determining, based on usage privileges defined in the description file, that the request to access the virtual image will be granted; and
- executing, by the hypervisor after granting access to the virtual image, the virtual image according to the usage privileges in the description file.

* * * * *